United States Patent Office 3,521,655
Patented July 28, 1970

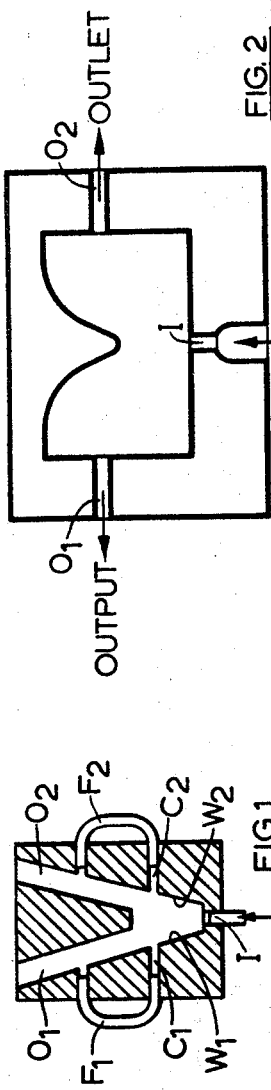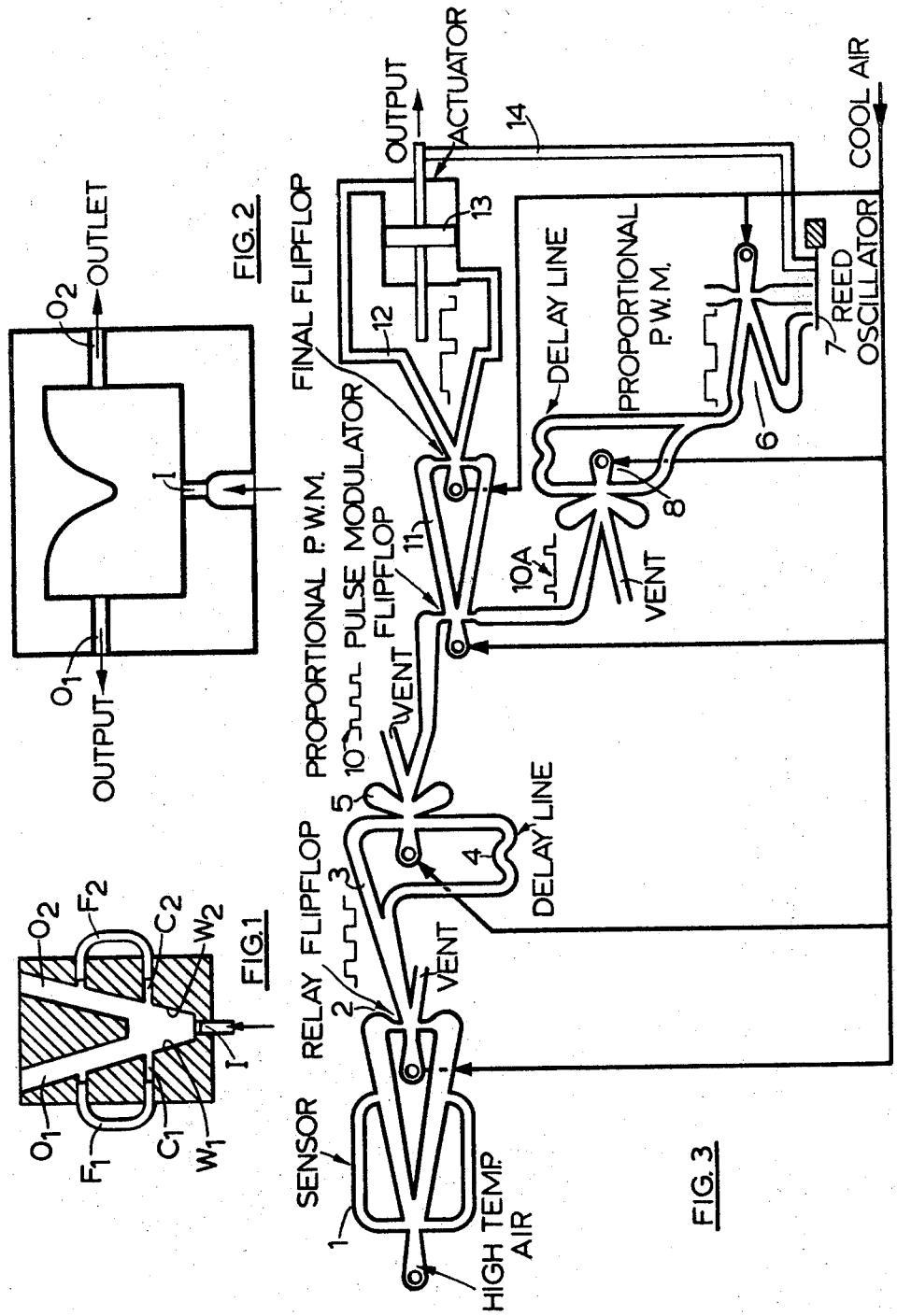

3,521,655
FLUIDIC TEMPERATURE SENSORS
Stanley George Glaze, Brierley Hill, England, assignor to H. M. Hobson Limited, London, England, a company of Great Britain
Filed June 7, 1968, Ser. No. 735,281
Claims priority, application Great Britain, July 5, 1967, 30,985/67
Int. Cl. F15c *3/08, 4/00*
U.S. Cl. 137—81.5                                    4 Claims

ABSTRACT OF THE DISCLOSURE

A fluidic sensor for measuring temperature and other variables including a fluidic oscillator which generates a train of pulses as a frequency representing the value of the variable, a variable frequency oscillator for generating another train of pulses and mechanism for comparing the frequencies of the two pulses in the two trains and adjusting the variable frequency oscillator to the frequencies in harmony.

---

This invention is concerned with a fluidic sensing apparatus which is particularly intended for use in sensing the high temperature prevailing in the turbine of a jet aircraft engine.

It utilizes for the purpose a probe constituted by a fluidic oscillator together with an all fluidic amplifying and indicating system which embodies very few moving parts.

Fluidic amplifiers and oscillators are known devices and typical examples are illustrated in FIGS. 1 and 2 of the accompanying drawings.

If a jet of gas or liquid is supplied through an inlet nozzle I (FIG. 1) it will tend to flow along one or other of two suitably disposed walls $W_1$, $W_2$, to an outlet $O_1$, or $O_2$. The jet may be switched from one wall to the other by the application of pressure pulses to control ports $C_1$, $C_2$ and the device will act as an amplifier in a manner analogous to a triode valve. If feed-back passages $F_1$, $F_2$ are provided between the outlets and the control ports, the device will act as an oscillator. When the jet switches to the wall $W_1$ a pressure signal will be propagated through the feed-back path $F_1$ to the control port $C_1$ and will switch the jet to the other wall when it reaches the port $C_1$. The frequency of switching from one outlet to the other is a function of the velocity of propagation of the pressure signal over a fixed distance and is a function of the temperature of the fluid entering the inlet I, being proportional to the square root of the absolute temperature of the fluid when the fluid is a gas.

The device shown in FIG. 2 also acts as an oscillator and both devices generate at each outlet a train of pressure pulses at a repetition frequency which is a function of the temperature of the entering fluid.

When the apparatus according to the invention is to be used as a temperature sensor, use is made of fluidic devices motivated by air. However, with suitable modifications of the system fluidic devices motivated by liquid could be used, for example when it is desired to measure the specific gravity or bulk modulus of a liquid. This can be achieved because the velocity of sound in a liquid is a unique function of the ratio of the specific gravity to the bulk modulus of the liquid.

The sensing apparatus according to the invention comprises a fluidic oscillator which acts as a sensor and produces a first train of pressure pulses at a repetition frequency representative of a variable to be sensed, a variable frequency fluidic oscillator which produces a second train of pressure pulses, a fluidic amplifier, means for applying a train of pressure pulses derived from the sensor to one control port of the amplifier and for applying a train of pressure pulses derived from the variable frequency oscillator to the other control port of the amplifier, an actuator subject on opposite sides to the average pressures developed at the outlets of the amplifier and movable in opposite directions in accordance with the pressure differential developed across it, and means controlled by the actuator for adjusting the variable frequency oscillator to bring the repetition frequency of the pulses generated thereby into harmony with the repetition frequency of the pulses generated by the sensor. The actuator will accordingly assume a position representative of the pulse frequency of the sensor and therefore of the sensed temperature.

When the sensor is used for sensing the temperature in the turbine of a jet engine it is highly desirable for the stages subsequent to sensor to be motivated by cooler air, derived for example from the output of the first or second stage compressor of the engine. In such a case the subsequent stages must include mechanism for eliminating the effects of variations in pressure and temperature of this cooler air.

One specific embodiment of temperature sensor according to the invention is illustrated diagrammatically in FIG. 3 of the drawings.

This comprises a fluidic oscillator 1 of the kind shown in FIG. 1 to the inlet of which is supplied air at high turbine temperature. The outlets of the oscillator 1 are respectively connected to the two control ports of a fluidic amplifier 2 which acts as a relay flip-flop and which is motivated by cooler air supplied to its inlet. One outlet of the amplifier 2 is vented, and a train of pulses of approximately square wave form is developed at its other outlet, at the same repetition frequency as the pulses developed by the sensor 1, i.e. at a repetition frequency representative of the temperature of the high temperature air. These pulses are supplied by a direct line 3 and a longer delay line 4 to the control ports of a proportional pulse width modulator 5, one outlet of which again is vented.

Arrival of a pulse at the control port of the modulator 5 through the direct line 3 switches the jet of cool air supplied to its inlet to the non-vented outlet, the jet being switched back to the vented outlet upon arrival of a pulse at the other control port through the delay line 4. The output of the modulator 5 thus consists of a train of pulses 10 of the same repetition frequency as that of the pulses from the sensor 1 but of a constant reduced pulse width corresponding to the difference in the time of propagation of signals through the lines 3 and 4.

A fluid oscillator 6, also motivated by cool air, generates a train of pulses at a repetition frequency determined by the effective length of a reed 7 which periodically opens and closes one of its control ports. This train of pulses is converted by a pulse width modulator 8 identical to the modulator 5 into a train of pulses 10A of the same constant width as the pulses of the train 10 but at a repetition frequency determined by the reed. The pulses of the trains 10, 10A are also of the same amplitude because they are derived from air at the same supply pressure. The pulse trains 10, 10A are applied to the control ports of flip-flop 11. The outlets of the flip-flop 11 thus receive the supply jet according to the pressure differential at its control ports, but if it be assumed that the flip-flop switches only on the receipt of a pressure differential and holds the output in that state until the differential reverses, the average value of the output at one outlet will be proportional to the frequency error, the output at the outlet opposite the control port with the greatest frequency being the greater, since the differential creating that state occurs more frequently.

The output of the flip-flop 11 is further amplified by a succeeding stage 12 and is applied to an actuator piston 13 as shown. Further smoothing of the pulsed output will occur in the integrations associated with actuator volume and mass, and the actuator piston 13 will accelerate proportionally with and in a direction appropriate to the magnitude and sign of the frequency error. This acceleration is proportional also to the supply pressure as recovered in the output ducts of the final stage 12.

However, by arranging for the actuator piston to modify the effective length of the reed 7 through a connection 14 and hence the frequency of the pulse train 10A a null is reached independent of pressure level. The null position assumed by the piston 13 will accordingly be representative of the temperature of the air entering the sensor 1.

As will be understood variations in temperature and pressure of the cool air will be eliminated by the identical modulators 5 and 8, the pulses of both trains always having the same height and width.

The piston 13 can be utilized to actuate a temperature indicator or a needle or bleed valve in the fuel supply system so as to control the fuel flow to the engine in response to changes in engine turbine temperature. Thus the turbine temperature may be limited by cutting back the fuel supply as necessary, or the device can be utilized for control of the fuel flow during periods of acceleration in such manner as to prevent compressor surge.

What I claim as my invention and desire to secure by Letters Patent is:

1. A fluidic temperature sensing apparatus comprising a fluidic oscillator motivated by cooler air which acts as a sensor and produces a first train of pressure pulses at a repetition frequency representative of the temperature to be sensed, a variable frequency fluidic oscillator motivated by cooler air which produces a second train of pressure pulses, a fluidic amplifier motivated by cooler air, means for applying a train of pressure pulses of cooler air at a repetition frequency determined by the sensor to one control port of the amplifier and for applying a train of pressure pulses derived from the variable frequency oscillator to the other control port of the amplifier, an actuator subject on opposite sides to the average pressures developed at the outlets of the amplifier and movable in opposite directions in accordance with the pressure differential developed across it, and means controlled by the actuator for adjusting the variable frequency oscillator to bring the repetition frequency of the pulses generated thereby into harmony with the repetition frequency of the pulses generated by the sensor.

2. Apparatus as claimed in claim 1, and which includes between each of the pulse generating oscillators and the amplifier identical fluidic pulse width modulators also motivated by the cooler air.

3. A fluidic sensing apparatus comprising a fluidic oscillator which acts as a sensor and produces a first train of pressure pulses at a repetition frequency representative of a variable to be sensed, a variable frequency oscillator which produces a second train of pressure pulses at a repetition frequency determined by a reed, a fluidic amplifier, means for applying a train of pressure pulses derived from the sensor to one control port of the amplifier and for applying a train of pressure pulses derived from the variable frequency oscillator to the other control port of the amplifier, an actuator subject on opposite sides to the average pressures developed at the outlets of the amplifier and movable in opposite directions in accordance with the pressure differential developed across it, and means controlled by the actuator for adjusting the effective length of the reed and thereby bringing the repetition frequency of the pulses generated by the variable frequency oscillator into harmony with the repetition frequency of the pulses generated by the sensor.

4. A fluidic temperature sensing apparatus comprising a fluidic oscillator motivated by hot air which acts as a sensor and produces a first train of pressure pulses at a repetition frequency representative of the temperature to be sensed, a variable frequency fluidic oscillator motivated by air which produces a second train of pressure pulses at a repetition frequency determined by a reed, a fluidic amplifier motivated by air, means for applying a train of pressure pulses derived from the sensor to one control port of the amplifier and for applying a train of pressure pulses derived from the variable frequency oscillator to the other control port of the amplifier, an actuator subject on opposite sides to the average pressures developed at the outlets of the amplifier and movable in opposite directions in accordance with the pressure differential developed across it, and means controlled by the actuator for adjusting the effective length of the reed and thereby bringing the repetition frequency of the pulses generated by the variable frequency oscillator into harmony with the repetition frequency of the pulses generated by the sensor.

References Cited

UNITED STATES PATENTS

| | | | |
|---|---|---|---|
| 2,879,467 | 3/1959 | Stern | 137—36 XR |
| 3,191,860 | 6/1965 | Wadey | 137—815 XR |
| 3,228,602 | 1/1966 | Boothe | 137—815 XR |
| 3,233,522 | 2/1966 | Stern | 137—815 XR |
| 3,292,648 | 12/1966 | Colston | 137—815 XR |
| 3,302,398 | 2/1967 | Taplin et al. | 137—815 XR |
| 3,342,198 | 9/1967 | Groeber | 137—815 |
| 3,348,562 | 10/1967 | Ogren | 137—815 |
| 3,388,862 | 6/1968 | Gabrielson | 137—815 |

SAMUEL SCOTT, Primary Examiner